(12) United States Patent
Steffen et al.

(10) Patent No.: US 8,356,531 B2
(45) Date of Patent: Jan. 22, 2013

(54) ACTUATING ELEMENT FOR A DEVICE MOVED BY A TRACTION ROPE AND A LORDOSIS SUPPORTING ELEMENT

(75) Inventors: Oliver Steffen, Coburg (DE); Guido Neumann, Ilmenau (DE)

(73) Assignee: Brose Fahrzeugteile GmbH & Co., Hallstadt (DE)

( * ) Notice: Subject to any disclaimer, the term of this patent is extended or adjusted under 35 U.S.C. 154(b) by 971 days.

(21) Appl. No.: 11/996,908

(22) PCT Filed: Jul. 7, 2006

(86) PCT No.: PCT/EP2006/006640
§ 371 (c)(1),
(2), (4) Date: Mar. 12, 2008

(87) PCT Pub. No.: WO2007/025597
PCT Pub. Date: Mar. 8, 2007

(65) Prior Publication Data
US 2008/0203794 A1  Aug. 28, 2008

(30) Foreign Application Priority Data
Aug. 30, 2005 (DE) .................. 20 2005 013 621 U

(51) Int. Cl.
*F16C 1/10* (2006.01)
(52) U.S. Cl. .................. 74/501.6; 74/500.5; 297/284.4; 297/284.2
(58) Field of Classification Search .................. 74/489, 74/500.5, 501.6, 502.2, 505, 506, 518, 523, 74/528–539; 297/284.1, 284.2, 284.4, 284.7, 297/284.8; 248/49–65; 254/395, 396
See application file for complete search history.

(56) References Cited

U.S. PATENT DOCUMENTS

| 2,529,447 | A | | 11/1950 | Bodinaux et al. |
| 4,429,590 | A | * | 2/1984 | Kopich ........................... 74/535 |
| 4,913,495 | A | * | 4/1990 | Nagasaka et al. .......... 297/284.4 |
| 5,067,365 | A | * | 11/1991 | Lauer ........................ 74/501.5 R |
| 5,477,746 | A | * | 12/1995 | Perisho et al. .................. 74/512 |
| 5,666,860 | A | * | 9/1997 | Baumann et al. .............. 74/513 |
| 5,916,331 | A | * | 6/1999 | Nagashima ..................... 74/516 |
| 6,282,980 | B1 * | | 9/2001 | Sykes ............................. 74/528 |
| 6,345,549 | B1 * | | 2/2002 | Lance ........................ 74/500.5 |
| 7,243,762 | B2 * | | 7/2007 | Tsai ........................... 188/24.22 |

FOREIGN PATENT DOCUMENTS

| EP | 0006840 | 2/1982 |
| EP | 1451478 | 8/2005 |
| GB | 471910 | 9/1937 |

* cited by examiner

*Primary Examiner* — Richard W Ridley
*Assistant Examiner* — Thomas Diaz
(74) *Attorney, Agent, or Firm* — Scott T. Weingaertner; Joseph D. Eng, Jr.; King & Spalding

(57) ABSTRACT

An actuating element for a lordosis supporting device driven by a traction rope and a lordosis supporting element in a vehicle seat are provided. The actuating device includes a deflecting element that is mounted on a frame such that it is pivotable about an actuating shaft and includes a rope guiding element that is arranged with the fastening point and the deflecting element in such a way that a rope portion leading toward the deflecting element and a rope portion leading away from the deflecting element are guided approximately parallel in a starting position. In preferred embodiments, a fixed end of the traction rope is fastened to the frame at a fastening point and a free end of the traction rope is guided at least partially around the deflecting element for actuating the device.

9 Claims, 3 Drawing Sheets

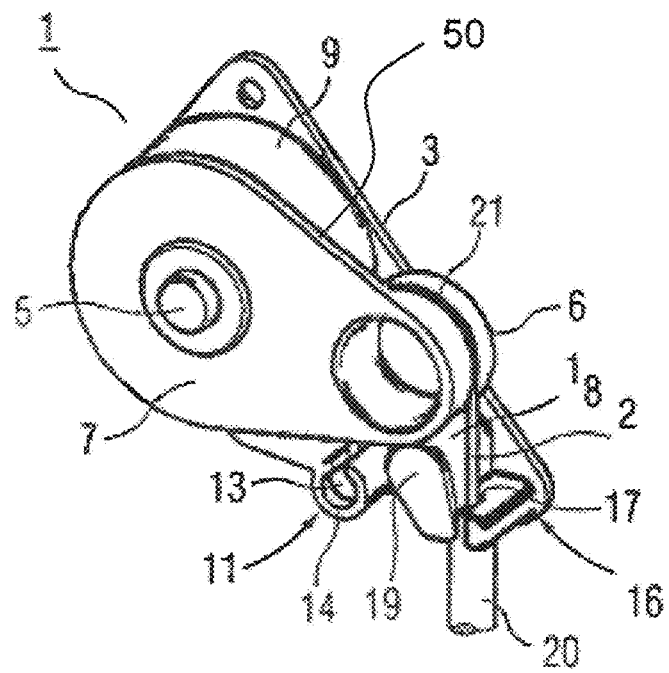
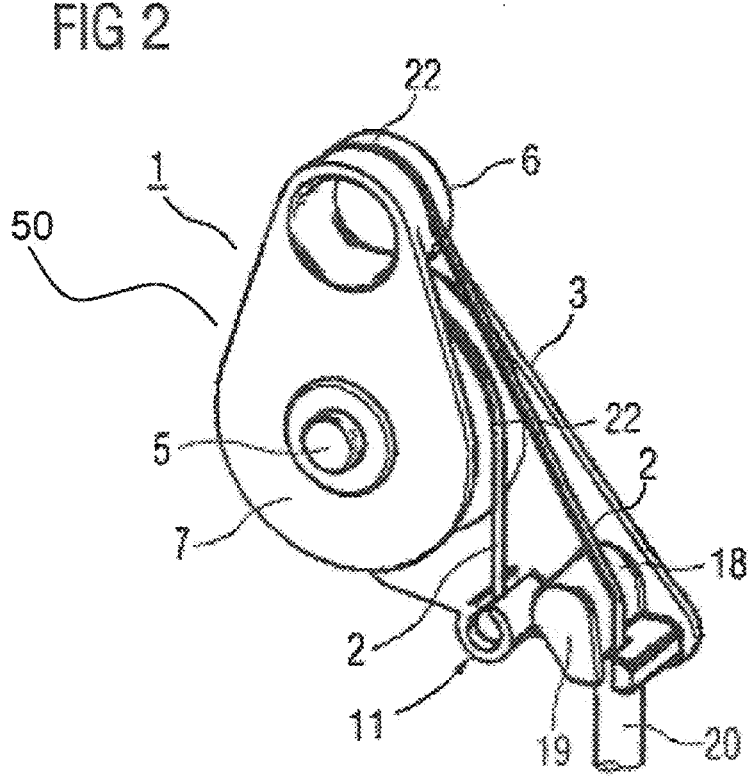

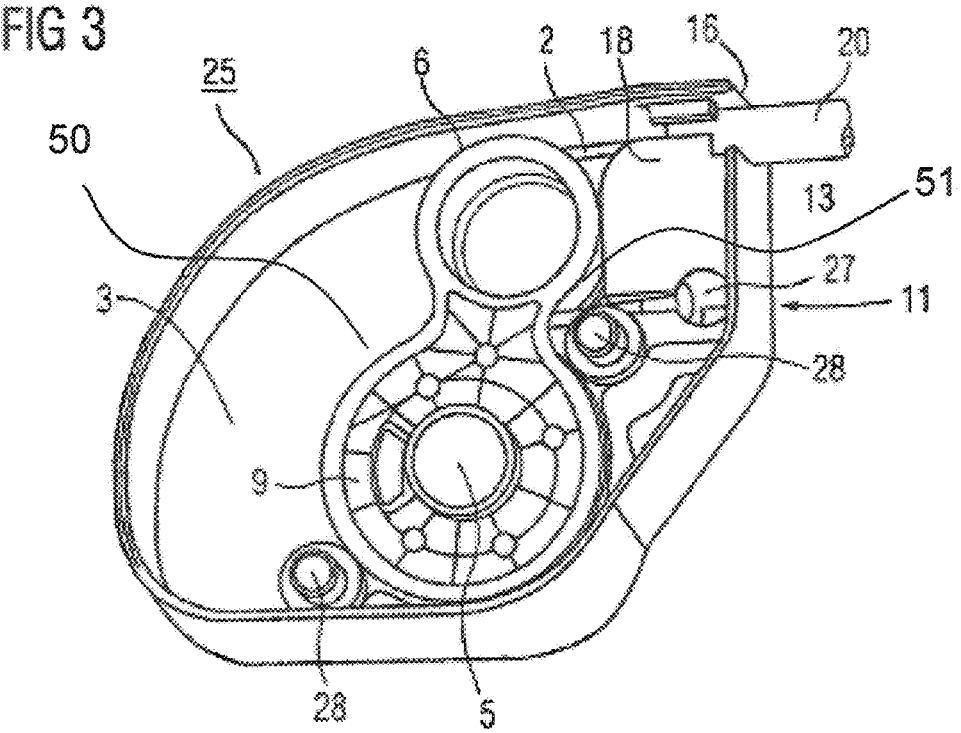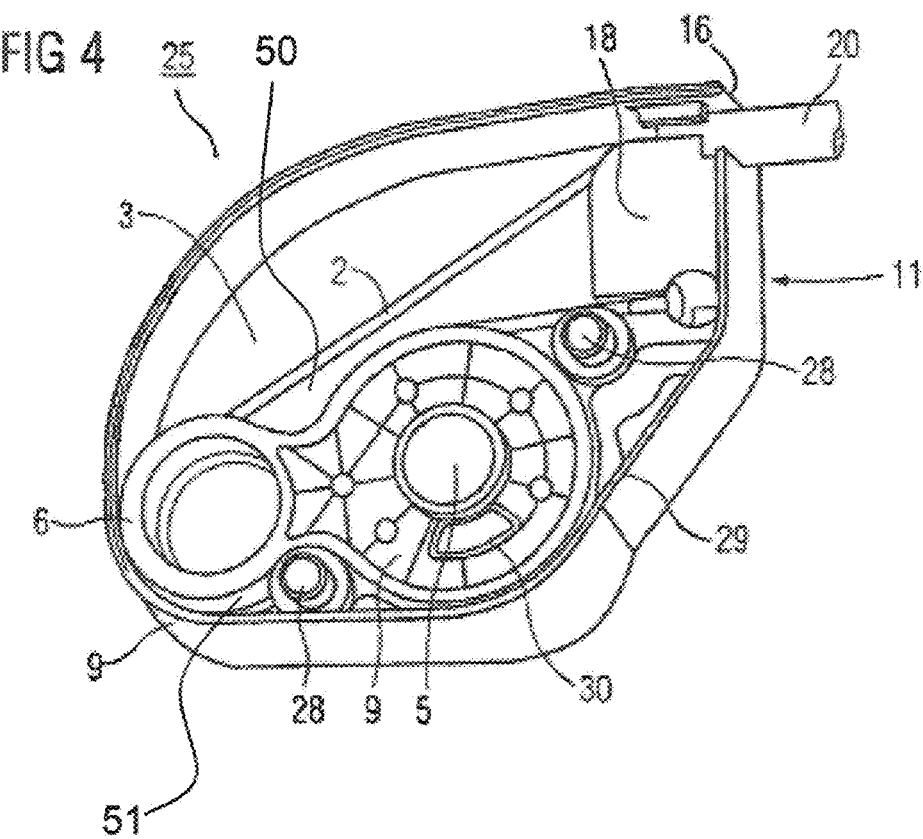

ACTUATING ELEMENT FOR A DEVICE MOVED BY A TRACTION ROPE AND A LORDOSIS SUPPORTING ELEMENT

FIELD OF THE INVENTION

The invention relates to an actuating element for a device driven by a traction rope such as, in particular, a lordosis supporting element and to a lordosis supporting element in a vehicle seat.

BACKGROUND OF THE INVENTION

When actuating a device driven by a traction rope, the problem frequently occurs that an actuating path that is as short as possible is intended to provide an adjustment path of the traction rope that is as long as possible. If, in particular, a handle or a rotary handle is used to actuate the traction rope, predetermined adjustment of the device driven by the traction rope is to be achieved for ergonomic actuation without the operator having to change grip. These problems occur, in particular, in the case of a lordosis supporting element driven by a traction rope such as is integrated, for example, in the backrest of a vehicle seat. A lordosis supporting element of this type serves to support the lumbar portion of the driver's spine, for which purpose the lordosis supporting element has a protrusion which is oriented forward toward the driver's back.

To form the protrusion, a lordosis supporting element of this type comprises a flexible support element on which a traction rope acts in such a way that tensile adjustment leads to curvature of the support element. In this case, the curvature becomes more marked as the traction rope is increasingly adjusted. To set the height, a support element of this type can itself be height-adjustable. Alternatively, the protrusion can also be formed as a result of the fact that the flexible support element is followed by a height-adjustable flexural carriage which uses correspondingly shaped metal elements in order locally to bulge the support element forward as it passes behind the support element. In this case, the bulging and height adjustment are carried out in a single step.

Traction rope-driven lordosis supporting elements in a vehicle seat are known, for example, from DE 101 35 473 A1 or DE 103 22 190 B3.

SUMMARY OF THE INVENTION

The object of the invention is to disclose an actuating element for a device driven by a traction rope, in particular a lordosis supporting element, allowing a high degree of adjustment of the traction rope with as little actuation as possible. A further object of the invention is to disclose a lordosis supporting element in a vehicle seat that may be operated particularly simply and ergonomically.

According to the invention, for an actuating element for a device driven by a traction rope, in particular a lordosis supporting element, the former object is achieved in that a deflecting element is mounted on a frame in such a way that it is pivotable about an actuating shaft and in that the fixed end of the traction rope is fastened to the frame at a fastening point and its free end is guided at least partially around the deflecting element for actuating the device.

In a first step, the invention starts from the consideration that guidance of the traction rope around a deflecting element can be utilized, in the manner of a reverse pulley, to multiply the adjustment path. This produces one rope portion leading toward the deflecting element and one rope portion leading away from the deflecting element, which portions are both lengthened or shortened in accordance with the movement of the deflecting element.

In a second step, the invention starts from the consideration that the ratio of the adjustment path of the traction rope and the actuating path can be improved still further if the deflecting element is mounted in such a way that it is pivotable about an actuating shaft. As a result, a rotational movement acting on the actuating shaft is converted into correspondingly enlarged adjustment of the traction rope by means of a lever arm joining together the actuating shaft and the deflecting element.

An actuating element of this type also offers the advantage of converting a rotational movement of approximately 90°, which can be achieved by human hand without changing grip, into a long adjustment path of the traction rope. An actuating element of this type thus allows simple and ergonomic operation of the device driven by a traction rope.

Advantageously, a rope guiding element is provided and arranged with the fastening point and the deflecting element in such a way that the rope portion leading toward the deflecting element and the rope portion leading away from the deflecting element are guided approximately parallel in a starting position. The rope guiding element is provided in this case for guiding and fixing the traction rope, so the traction rope is not laterally offset during the actuation of the actuating element. In particular, the rope guiding element can comprise an opening or a guide hole through which the traction rope is guided. It is also conceivable to configure the traction rope in the form of a Bowden cable, the outer casing of the Bowden cable resting in the rope guiding element.

If the rope guiding element, the fastening point and the deflecting element are arranged in such a way that the arriving and the departing rope portions are approximately parallel, actuation of the deflecting element by a specific distance leads to adjustment of the traction rope by approximately twice that distance. Furthermore, an arrangement of this type is particularly compact.

In a further advantageous embodiment of the invention, a second deflecting element is provided in such a way that the traction rope at least partially orbits the second deflecting element in a deflected position. This embodiment allows the adjustment path of the traction rope to be further increased. This is carried out, example, as a result of the fact that, on actuation of the actuating element, the pivoting movement causes the traction rope to snake in the rope guiding element. If a second deflecting element obstructs this snaking traction rope, the departure from the straight course of the snaking traction rope further lengthens its adjustment path. The second deflecting element may, for example, be circular in its configuration.

In an expedient development of the invention, the second deflecting element is mounted so as to be able to rotate about the actuating shaft and the first deflecting element is fastened to the second deflecting element. This embodiment saves space and material, as the second deflecting element simultaneously forms the lever between the actuating shaft and the first deflecting element.

In order to reduce the friction of the traction rope, it is advantageous to arrange means for reducing friction on the or each deflecting element. This can be carried out, for example, by individual rolls or by a friction-reducing surface or lubricant. However, a roll which orbits the deflecting element and on which the traction rope rolls is advantageously provided as the means for reducing friction. To some extent, the circumference of the roll is in this case the running surface for the traction rope.

Since—as stated hereinbefore—the traction rope snakes as a result of the pivoting movement of the first deflecting element in the rope guiding element, it is expedient to form a rounded edge at this location. This prevents phenomena of wear to the traction rope resulting from friction in the rope guiding element.

Expediently, the actuating element for actuating the pivoting movement comprises a handle, in particular a handwheel, or a drive motor. It is in this case irrelevant whether the rotary handle or the drive motor acts for example non-positively or positively on the actuating shaft, on which for example the second deflecting element is fixed, or else directly engages the parts required for the pivoting movement of the first deflecting element. For this purpose, the shaft itself may, for example, be fixed and the further parts mounted movably thereon.

It is also advantageous if a fixing brake is provided for locking an actuating position. A fixing brake of this type prevents the traction rope from being drawn back into its original position, once the actuation has been completed, via any restoring force of the device to be actuated. The fixing brake can be provided by a positive fit, such as for example by locking elements, or by a non-positive fit, such as for example by spring elements. It is particularly simple and effective if the fixing brake is configured as a wrap spring arranged inside the second deflecting element. A wrap spring of this type either acts directly on the second deflecting element or brakes a movable actuating shaft on which the first deflecting element is pivotably arranged.

According to the invention, the latter object, concerning a lordosis supporting element in a vehicle seat having a flexible support element and a traction rope acting on the support element or on a flexural carriage for the purposes of bending, is achieved in that the traction rope is connected to the above-described actuating element.

A vehicle seat equipped with a lordosis supporting element of this type allows ergonomic operation of the support element arranged in the backrest. Rotational movement of 90° allows, especially when the traction rope acts on the support element, the protrusion clearance thereof to be utilized as a whole.

BRIEF DESCRIPTION OF THE DRAWINGS

FIG. 1 is a perspective view of a first actuating element in a starting position.

FIG. 2 is a perspective view of the first actuating element in an end position.

FIG. 3 is a perspective view of a partially opened further actuating element in a starting position.

FIG. 4 is a perspective view of the partially opened further actuating element in an end position.

DETAILED DESCRIPTION OF THE INVENTION

Figure 5:
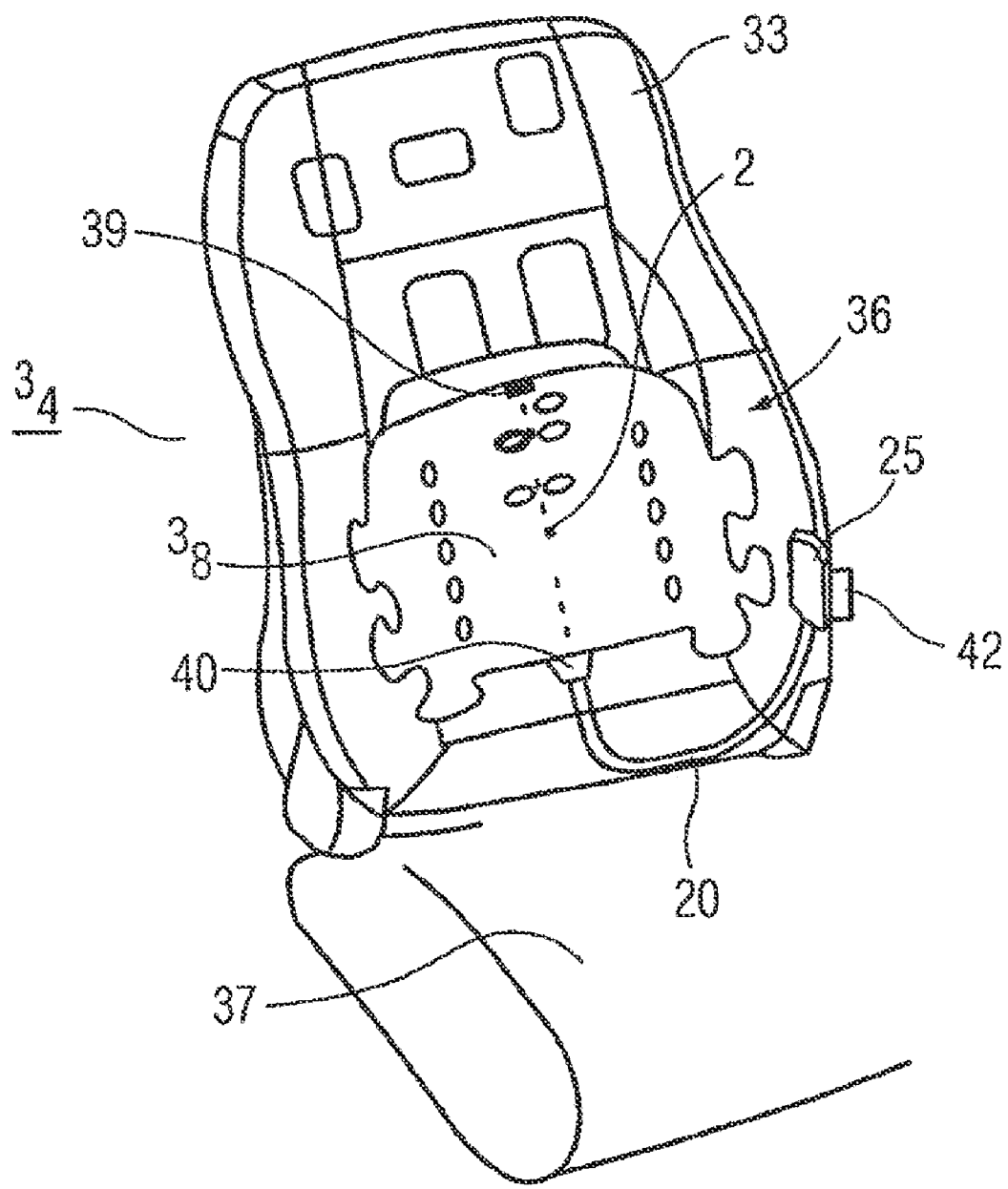
FIG. 5 is a schematic illustration of a backrest of a vehicle seat with a lordosis supporting element arranged thereon.

FIG. 1 is a perspective view of a first actuating element 1 for actuating a traction rope 2. For this purpose, the actuating element 1 has a frame 3 to which a first deflecting element 6 is fastened, mounted in such a way that it is pivotable about an actuating shaft 5. A coupling member 7, which is fastened to the actuating shaft 5, is provided for this pivotable mounting. The frame 3 also has a second deflecting element 9 in which the coupling member 7 is guided.

In the illustrated starting position of the actuating element 1, one end of the traction rope 2 is rigidly connected to the frame 3 at a fastening point 11 by means of a soldered nipple 13 which is introduced into a cylinder bore 14. The traction rope 2 then partially orbits the first deflecting element 6 and its free end is subsequently guided via a rope guiding element 16 for actuating a device (not shown). For this purpose, the rope guiding element 16 has an opening 17 and a rounded edge 18 formed by an elevation 19 out of the frame 1. A casing 20, through which the free end of the traction rope 2 is extended in the manner of a Bowden cable, rests on the opening 17.

In order to prevent the traction rope 2 from slipping on the first deflecting element 6 during actuation of the actuating element 1, said first deflecting element has a notch 21 in which the traction rope 2 is guided. The actuating shaft 5 is rotated by means of an actuating element (not shown), such as for example a handwheel, for the purposes of actuation. The coupling member 7, which is arranged on the actuating shaft 5, can be rotated out of the starting position shown in FIG. 1 into the end position shown in FIG. 2, thus producing the pivoting movement of the first deflecting element 6.

The traction rope 2 is increasingly withdrawn from the casing 20 by rotating the coupling member 7 from the starting position according to FIG. 1 into the end position according to FIG. 2. As the rope portion leading from the fastening point 11 toward the first deflecting element 6 and the rope portion leading away from the deflecting element to the rope guiding element 16 extend approximately parallel to each other in the starting position according to FIG. 1, the traction rope 2 travels, on pivoting of the first deflecting element 6, an approximately doubled adjustment path as, in the event of a simple movement of the first deflecting element 6, both rope portions have to extend in accordance with this movement.

If the first deflecting element 6 is in the end position illustrated according to FIG. 2, the traction rope 2 snakes in the rope guiding element 16. The rounded edge 18, along which a portion of the traction rope extends, is provided to prevent wear at this point.

In the end position illustrated according to FIG. 2, the traction rope 2 coming from the rope guiding element 18 orbits the deflecting element 6 in the notch 22 formed at this location and subsequently a portion of the second deflecting element 9, from where it passes to its fastening point 11. As the second deflecting element 9 has a circular diameter, the adjustment path of the traction rope 2 is additionally extended as a result of the orbiting of the circumferential portion 22 of the second deflecting element 9.

FIG. 3 is a perspective view of a partially opened further actuating element 25 comprising substantially a frame 3 configured in the form of a half-shell and also a first deflecting element 6 and a second deflecting element 9. Again, the traction rope 2 orbits the first deflecting element 6 and is subsequently fastened at a fastening point 11 of the frame 3 by means of a soldered nipple 13, in the present case in a hole 27.

The first deflecting element 6 is substantially cylindrical in its configuration, the traction rope 2 being guided on the cylinder wall. The first deflecting element 6 is rigidly connected to the second deflecting element 9 which is also substantially cylindrical in its configuration. The second deflecting element 9 is arranged non-positively on an actuating shaft 5 which can be actuated—in a manner not shown—from the back of the frame 3 by means of a handwheel.

In order to attach a cover to the half-shell of the frame 3, said frame has two plug contacts 28 which engage with corresponding recesses in the cover (not shown) during closure.

If the actuating shaft 5 is actuated, the first deflecting element 6 pivots from the starting position shown in FIG. 3 into the end position shown in FIG. 4. The further actuating element 25 has on the rope guiding element 16, again, a rounded edge 18 to prevent wear to the traction rope 2 snaking at this location.

In the end position, the traction rope 2 coming from the rope guiding element 16 orbits the cylinder wall of the first deflecting element 6 and subsequently a portion of the cylinder wall of the second deflecting element 9 in order subsequently to pass to the fastening point 11.

In contrast to the first actuating element 1, the second deflecting element 9 of the further actuating element 25 is connected directly to the actuating shaft 5. A guide wall 29 extending partially on the circumference of the second deflecting element 9 is provided to stabilize the lever formed as a whole from the first deflecting element 6 and the second deflecting element 9. A wrap spring 30, which—fastened to the frame 3—presses on the inside of the second deflecting element 9 and therefore locks an actuating position, is also arranged inside the second deflecting element 9.

FIG. 5 shows schematically the frame of a backrest 33 of a vehicle seat 34, a lordosis supporting element 36 being integrated into the backrest 33. The seat surface 37 is merely indicated. The lordosis supporting element 36 comprises a flexible support element 38 which is suitable for supporting the lumbar portion of a driver's spine by means of a protrusion.

In order to achieve the protrusion of the support element 38, a traction rope 2, which, at the upper end of the support element 38, is rigidly connected thereto at the fastening point 39, acts thereon. A counter bearing 40, on which the casing 20 of the traction rope 2 rests in the manner of a Bowden cable, is located at the lower end of the support element 38. The casing 20, and thus the traction rope 2 guided therein, is guided along the frame of the backrest 33 to an actuating element 25 configured in accordance with FIGS. 3 and 4. For actuating the actuating element 25, said actuating element has a handwheel 42.

If the handwheel 42 is actuated, the traction rope 2 is drawn through the casing 20 via the mechanism, shown in FIGS. 3 and 4, of the actuating element 25, thus shortening the distance between the counter bearing 40 and the fastening point 39. Accordingly, the support element 38 bulges forward, supported by suitable pre-shaping. The stroke of the protrusion can conveniently be set within rotation of 90° by means of the handwheel 42.

What is claimed is:

1. An actuating element for a lordosis-support device driven by a traction rope,
    wherein a first deflecting element is mounted with a lever arm on a frame in such a way that it is pivotable about an actuating shaft, wherein the lever joins together the first deflecting element and the actuating shaft,
    wherein a fixed end of the traction rope is fastened to the frame at a fastening point and a free end of the traction rope is guided at least partially around the first deflecting element for actuating the device, and
    wherein a rope guiding element is arranged with the fastening point and the first deflecting element in such a way that a rope portion ending at and leading toward the first deflecting element and a rope portion starting at and leading away from the first deflecting element are guided approximately parallel in a starting position, and
    wherein a second deflecting element is provided in such a way that the traction rope at least partially orbits the second deflecting element in a deflected position.

2. The actuating element according to claim 1, wherein the second deflecting element is mounted so as to be able to rotate about the actuating shaft and the first deflecting element is fastened to the second deflecting element.

3. The actuating element according to claim 1, wherein means for reducing friction are arranged on the first deflecting element.

4. The actuating element according to claim 3, wherein a roll which orbits the first deflecting element and on which the traction rope rolls is provided as the means for reducing friction.

5. The actuating element according to claim 1, wherein the rope guiding element comprises a rounded edge.

6. The actuating element according to claim 1, further comprising a handle for actuating the pivoting movement, wherein the handle is a handwheel or a drive motor.

7. The actuating element according to claim 1, further comprising a fixing brake for locking an actuating position.

8. The actuating element according to claim 7, wherein the fixing brake is configured as a wrap spring arranged inside the second deflecting element.

9. A lordosis support in a vehicle seat comprising a flexible support element and a traction rope acting on the support element or on a flexural carriage for the purposes of bending, wherein the traction rope is connected to an actuating element according to claim 1.

* * * * *

UNITED STATES PATENT AND TRADEMARK OFFICE
CERTIFICATE OF CORRECTION

PATENT NO. : 8,356,531 B2
APPLICATION NO. : 11/996908
DATED : January 22, 2013
INVENTOR(S) : Oliver Steffen et al.

It is certified that error appears in the above-identified patent and that said Letters Patent is hereby corrected as shown below:

Title page, Item (73) Assignee: The Assignee "Brose Fahrzeugteile Gmbh & Co., Hallstadt (DE)" should read -- Brose Fahrzeugteile Gmbh & Co. Kommanditgesellschaft, Coburg, Germany --.

Signed and Sealed this
Second Day of April, 2013

Teresa Stanek Rea
*Acting Director of the United States Patent and Trademark Office*